United States Patent [19]

Crall et al.

[11] 4,022,170
[45] May 10, 1977

[54] CIRCUIT FOR GENERATING A TEMPERATURE COMPENSATED THROTTLE ADVANCE SIGNAL HAVING POSITION AND RATE COMPONENTS

[75] Inventors: Frederick William Crall, Farmington; LaVerne Andrew Caron, Sterling Heights, both of Mich.

[73] Assignee: Chrysler Corporation, Highland Park, Mich.

[22] Filed: Apr. 22, 1975

[21] Appl. No.: 570,934

[52] U.S. Cl. .................... 123/117 R; 123/32 ED
[51] Int. Cl.$^2$ .................... F02P 5/04; F02B 3/00
[58] Field of Search ... 123/32 EA, 117 R, 146.5 A, 123/148 E, 139 E, 117 A

[56] References Cited

UNITED STATES PATENTS

| | | | |
|---|---|---|---|
| 1,882,720 | 10/1932 | Arthur | 123/117 R |
| 3,672,345 | 6/1972 | Monpetit | 123/32 EA |
| 3,673,989 | 7/1972 | Aono | 123/32 EA |
| 3,818,877 | 6/1974 | Barrera | 123/32 EA |
| 3,861,363 | 1/1975 | Williams | 123/139 E |
| 3,935,851 | 2/1976 | Wright | 123/32 EA |

*Primary Examiner*—Ronald B. Cox
*Attorney, Agent, or Firm*—Talburtt & Baldwin

[57] ABSTRACT

A circuit for generating a throttle advance signal for use in an electronic engine spark timing control system contains: a throttle position transducer circuit which develops a constant frequency pulse train wherein the width of the pulses is modulated in accordance with throttle position derived from a throttle position transducer; a pulse to analog conversion circuit with ambient air temperature compensation which converts the pulse train into a temperature compensated analog signal representative of throttle position; and a throttle rate circuit which monitors the rate of change of throttle position to provide a throttle rate signal whose sensitivity is inversely proportional to ambient air temperature but whose magnitude is independent of ambient air temperature. The throttle advance signal is a function of both the throttle position signal and the throttle rate signal. The throttle advance signal is used to adjust engine spark timing in accordance with throttle operation.

15 Claims, 2 Drawing Figures

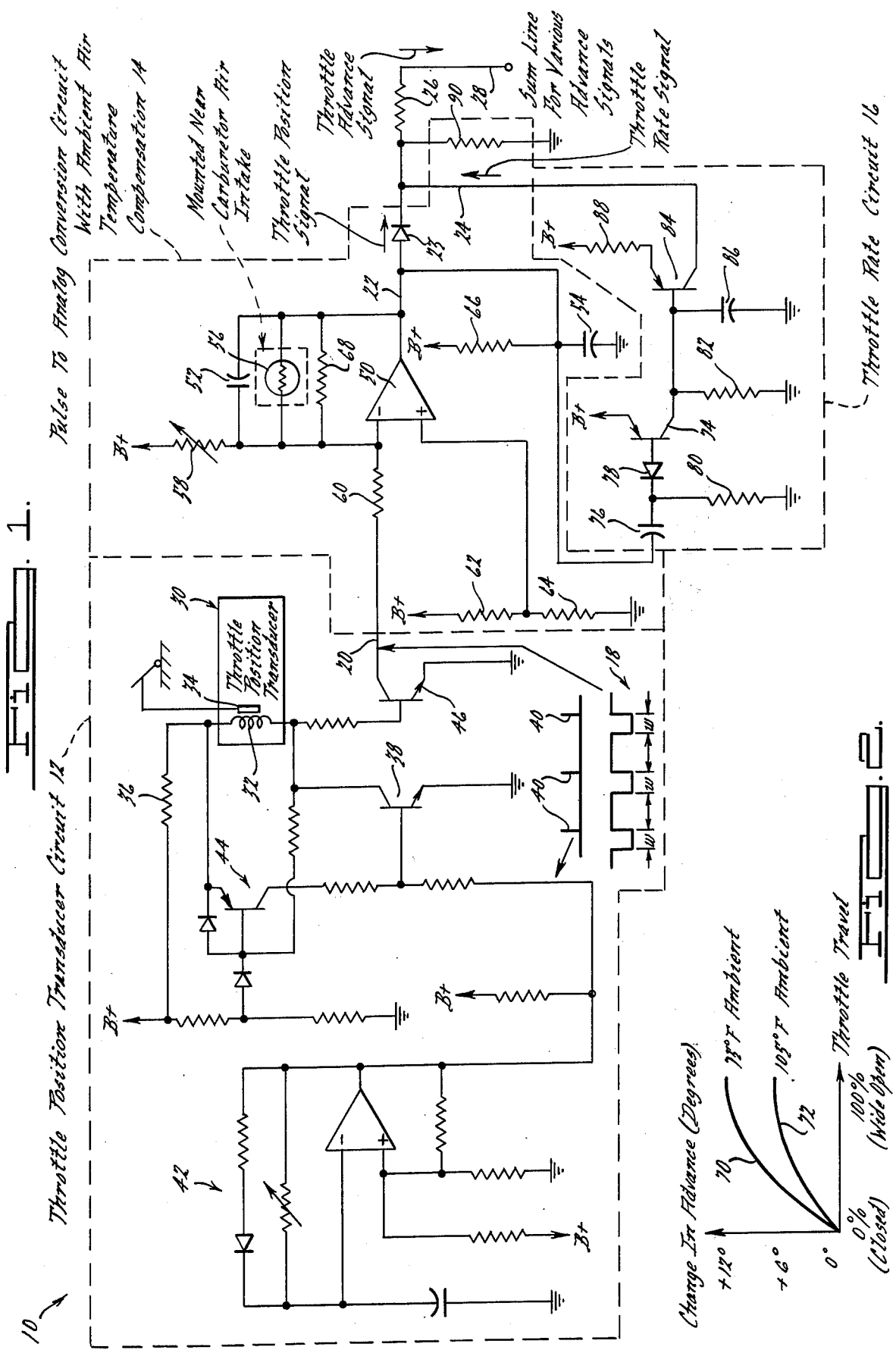

CIRCUIT FOR GENERATING A TEMPERATURE COMPENSATED THROTTLE ADVANCE SIGNAL HAVING POSITION AND RATE COMPONENTS

CROSS REFERENCE TO RELATED APPLICATION

The co-pending application S.N. 559,203, filed March 17, 1975 of LaVerne Andrew Caron, Lawrence William Tomczak, and Fredrick William Crall entitled "Transducer Circuits" and assigned to the same assignee as the present application is incorporated herein by reference.

BACKGROUND AND SUMMARY OF THE INVENTION

This invention relates to electronic circuits useful in engine control applications and in particular to a novel circuit for generating a temperature compensated throttle advance signal as a function of throttle operation.

In engine control applications it is often desirable to develop a signal representative of throttle position. As disclosed in the co-pending application S.N. 570,671 filed Apr. 25, 1975 of Gordon W. Fenn entitled "Engine Control System" and assigned to the same assignee as the present application, it has been discovered that improved engine performance can be obtained by using a throttle advance signal to adjust the engine spark timing as a function of throttle operation and by temperature compensating the throttle advance signal as a function of ambient air temperature.

It has been further found desirable to make the throttle advance signal a function of both throttle position and the rate of throttle operation.

The present invention is directed toward a novel electronic circuit for accomplishing the above objectives. One feature relates to a novel way of temperature compensating the throttle advance signal. Another feature, to a novel way of deriving the throttle advance signal as a function of both throttle position and rate of change of throttle position.

These features, along with additional features, advantages ad benefits, of the present invention will be seen in the ensuing description and claims which are to be considered in conjunction with the accompanying drawing.

BRIEF DESCRIPTION OF THE DRAWING

The drawing illustrates a peferred embodiment of the present invention according to the best mode presently contemplated in carrying out the invention.

FIG. 1 is a detailed electronic schematic diagram of a circuit incorporating principles of the present invention.

FIG. 2 is a graph plot useful in explaining the operation of the circuit of FIG. 1.

DESCRIPTION OF THE PREFERRED EMBODIMENT

The throttle advance circuit 10 in FIG. 1 comprises a throttle position transducer circuit 12, a pulse to analog conversion circuit with ambient air temperature compensation 14, and a throttle rate circuit 16. Briefly, transducer circuit 12 develops a pulse train waveform 18 which contains throttle position information. This waveform is developed at line 20 which connects circuits 12 and 14. Circuit 14 in turn develops at line 22 an analog voltage signal whose magnitude is representative of the throttle position. This signal is supplied through a diode 23 to the output which is taken at a line 24. Circuit 16 monitors the rate of change of the signal at line 22 and when the throttle increasingly opens at or above a certain threshold rate, it yields a signal at line 24 which, as will be explained later, effectively overrides the effect of the throttle position signal from line 22 insofar as the ultimate effect on the throttle advance signal is concerned. The throttle advance signal is developed as current flow through a calibration resistor 26 into a sum line 28 at which a number of various advance signals are algebraically summed.

Considering the individual circuits in greater detail, one will note that throttle position transducer circuit 12 comprises a throttle position transducer 30 including a coil 32 and a core 34. An especially good transducer is described and claimed in co-pending application S.N. 559,204, filed March 17, 1975 of Lavern Andrew Caron, Lawrence William Tomczak, Fredrick William Crall, and Walter Joseph Campau entitled "Variable Inductance Transducers" and assigned to the same assignee as the present application. Coil 32 is electrically connected in circuit as a part of an RL one-shot, or monostable, circuit including a resistor 36. Core 34 is operatively coupled with the engine throttle such that the inductance of the transducer will vary as a function of the throttle position between closed and opened positions thereof. The RL one-shot circuit defined by resistor 36 and transducer 30 is caused to undergo an electrical transient by controlled switching of a main control transistor 38. Transistor 38 is periodically triggered into conduction by means of positive triggering pulses 40 supplied from a pulse generator circuit 42. In response to each triggering pulse, the conduction of transistor 38 permits coil 32 to be charged from the B+ supply through resistor 36 and the collector-emitter circuit for transistor 38. In response to the switching of transistor 38 into conduction, the voltage at the junction of coil 32 and resistor 36 decays along an RL time constant determined by the inductance of transducer 30 and the resistance of resistor 36. A feedback circuit 44 is provided to monitor the voltage at the junction of coil 32 and resistor 36 and is used to maintain transistor 38 in conduction until the magnitude of the voltage transient has decayed to a predetermined magnitude at which time conduction of transistor 38 is terminated. The duration for which transistor 38 conducts varies linearly with the inductance of transducer 30. Because the inductance of transducer 30 is a function of throttle position, the duration for which transistor 38 conducts in response to each triggering pulse 40 from pulse generator 42 will be a function of throttle position. By providing a relationship wherein the inductance of transducer 30 diminishes as the throttle is increasingly opened, the duration of conduction of transistor 38 in response to each triggering pulse 40 is in inverse proportion to the amount of throttle opening. An output transistor stage 46 monitors the conductivity of transisitor 38 so that stage 46 is conductive when transistor 38 is not, and vice versa. Thus, the duration for which transistor stage 46 is non-conductive is in inverse proportion to the amount of throttle opening. By providing a fixed frequency for trigger pulses 40, as in the present embodiment, it is also true that the duration for which stage 46 is conductive (i.e. the pulse width W) is in direct proportion to the amount of throttle opening. If desired, greater detail of circuit 12 may be obtained from the above cross-referenced application.

Pulse to analog conversion circuit with ambient air temperature compensation 14 comprises a comparator 50, a pair of capacitors 52, 54, a thermistor 56 and a plurality of resistors 58, 60, 62, 64, 66 and 68. Resistors 62, 64 are connected as a voltage divider across the B+ supply to provide a reference signal to the non-inverting input of comparator 50. Illustratively, this reference signal is 20% of the B+ supply voltage. The output stage 46 or circuit 12 is coupled via line 20 and through resistor 60 to the inverting input of comparator 50. Capacitor 52, thermistor 56 and resistor 68 are connected in parallel with each other from the output of comparator 50 to the inverting input of comparator 50. Resistor 58 is connected as a trimming resistor from the positive terminal of the B+ supply to the inverting input of comparator 50. Comparative 50 is a voltage type comparator which provides at its output a controlled impedance path to ground whose impedance is proportional to the voltage differential across its inputs. Hence to produce a usable output signal, the output terminal of comparator 50 connects through pull-up resistor 66 to the positive terminal of the B+ supply. The connection of capacitor 54 between the output terminal of comparator 50 and ground provides unity gain compensation to convert the circuit into an operational amplifier.

Ignoring for a moment the effect of thermistor 56, the operational amplifier circuit in effect averages pulse waveform 18 to develop at line 22 a voltage whose magnitude is representative of the throttle opening. More specifically, the operational amplifier used in circuit 14 averages the conductivity of transistor stage 46, as applied through resistor 60 to the inverting input of the comparator, relative to the reference voltage applied to the non-inverting input. Since it is duration of conductivity of stage 46 is proportional to throttle opening, values for the illustrated circuit components are selected to yield a frequency response characteristic such that change in the pulse width W is accurately tracked and reflected in the magnitude of the signal appearing at line 22. The values of capacitor 52 and resistor 68 are primarily responsible for the frequency response characteristic. The D.C. gain of the circuit is determined primarily by the ratio of resistor 68 to resistor 60, and in the absence of thermistor 56, the gain of the circuit is essentially constant. However, by connecting thermistor 56 as illustrated in the drawing, the D.C. gain of the circuit becomes a function of the resistance of thermistor 56, specifically being determined by the ratio of the parallel combination of resistor 68 and thermistor 56 to resistor 60. By locating thermistor 56 in a suitable location to sense the temperature of ambient air entering the engine for combustion, (for example, near the throttle air intake) ambient air temperature compensation is achieved. The gain of the circuit is caused to decrease as temperature sensed by thermistor 56 increases. This has the effect of attenuating the throttle position signal as the temperature of ambient air increases.

FIG. 2 is an example which illustrates the effect of ambient air temperature compensation on the throttle advance signal for a condition where the throttle advance signal is determined solely by the throttle position signal. At 75° F. ambient, the circuit exhibits a characteristic illustrated by curve 70. At 105° F. ambient, the throttle advance signal characteristic is shown by curve 72. By attenuating the throttle advance signal with increasing temperature, improved engine operation is attained. For ambient temperatures below 75° F. the resistance of thermistor 56 becomes sufficiently great that it has essentially negligible effect. While both curves 70 and 72 exhibit a certain curvature, this is due to the linkage connection between the throttle and the transducer; the circuit operation per se is substantially linear.

Resistor 58 is adjusted, with the throttle closed, to trim the output at comparator 50 so that it equals the reference signal supplied to the non-inverting input. Since the potential at the inverting input of comparator 50 is inherently virtually equal to that at the non-inverting input, there is no D.C. current flow in termistor 56 when the throttle is closed. This is advantageous in achieving maximum accuracy since it allows the circuit to be calibrated without the need to know the temperature of thermistor 56.

Throttle rate circuit 16 comprises two transistor stages. The first stage is composed of a transistor 74, a capacitor 76, a diode 78, and a pair of resistors 80, 82. The second stage consists of a transistor 84, a capacitor 86, and a resistor 88. Normally, transistor 74 is conducting and transistor 84 is non-conducting, and under this condition there is now current flow from the collector of transistor 84 into line 24. Thus, the throttle rate signal normally gives no advance. Capacitor 76 and resistor 80 determine the frequency response of circuit 16 and hence the capability of the circuit in detecting changes in the throttle position signal at line 22. So long as the signal at line 22 changes relatively slowly in comparison to the response characteristics of resistor 80 and capacitor 76, then the conductivity of transistor 74 remains unaffected; i.e., the transistor remains conductive. However, should there be a change in the signal at line 22 which is sufficiently fast that the changes is not immediately tracked by circuit 16, then transistor 74 is temporarily switched into non-conduction. With transistor 74 non-conducting, transistor 84 is switched into conduction to cause current to be supplied from the B+ supply, through resistor 88, the emitter-collector circuit of transistor 84 and into line 24. Now the throttle rate signal gives a certain amount of advance. By making resistors 66 and 88 equal, the advance due to the throttle rate signal will equal the maximum advance capable of being obtained from the throttle position signal. In the illustrated embodiment this advance due to the throttle rate signal is constant for a given ambient temperature and the duration for which it is given depends upon the rate of change of the throttle position signal. The greater the rate of change of the throttle position signal, the larger the positive pulse which is coupled to capacitor 76 to turn off transistor 74. The larger the pulse applied to turn off transistor 74, the longer the recovery time for the transistor to return to conduction. The longer that the first stage is circuit 16 is conductive, the longer the duration of the throttle rate signal. In passing, it should be noted that diode 78 serves to protect transistor 74 from excessive reverse voltage when the throttle position changes suddenly toward a closed position; also that capacitor 86 is for the purpose of filtering noise.

The throttle advance signal is a function of both the throttle position signal and the throttle rate signal. In the present embodiment the throttle position signal magnitude will normally determine the magnitude of the throttle advance signal. However, when the throttle rate signal is given, the throttle advance signal will be determined by the throttle rate signal, the throttle rate signal in effect overriding the throttle position signal. Thus, with the present embodiment the throttle advance signal will normally be in proportion to the throttle position signal as illustratively shown by each of the curves in FIG. 2; however, when the throttle is opened at a sufficiently fast rate to be detected by throttle rate circuit 16, then maximum throttle advance signal is given, the throttle rate circuit in effect overriding the throttle position signal under this condition. In order to accomplish this manner of operation, output current from line 22 is conducted through the appropriately poled diode 23 and the resistor 26 into sum line 28. Line 24 is connected to the junction of diode 23 and resistor 26. In this way the two circuits 14 and 16 have their outputs isolated from each other, but the throttle advance signal will be determined by whichever one of the two circuits 14, 16 is producing the larger output. A pull-down resistor 90 is connected from the junction of diode 23 and resistor 26 to ground for the purpose of always keeping diode 23 forward biased so that there is no deadband in the throttle advance signal. Resistor 26 is an advance control resistor which scales the output current into line 28 for scaling the amount of advance commanded by the throttle advance circuit.

It should be stated that the temperature attenuation of the throttle position signal causes the sensitivity of throttle rate circuit 16 (and hence of the throttle rate signal) to decrease as the ambient air temperature increases; however, with the illustrated circuit, the throttle rate signal, once given, has a magnitude which is independent of ambient air temperature. While a preferred embodiment of the circuit has been disclosed, it will be appeciated that other circuit configurations falling within the scope of the present invention may be designed with conventional techniques on the basis of the present disclosure, and the present embodiment is to be considered in an illustrative, rather than a limiting, sense.

What is claimed is:
1. A throttle advance signal generating circuit for generating a throttle advance signal representing a controlled amount of spark timing advance in response to operation of a carburetor throttle and the temperature of ambient air entering the carburetor comprising:
    transducer circuit means for generating a pulse waveform representative of the throttle position;
    amplifier circuit means for converting said pulse waveform into an analog signal;
    sensing means for sensing the temperature of ambient air entering the carburetor;
    means for attenuating the gain of said amplifier circuit means as a function of the temperature of ambient air sensed by said sensing means;
    and means for adjusting the spark timing advance in accordance with said analog signal whereby said throttle advance signal is provided by said analog signal.
2. A throttle advance signal generating circuit as claimed in claim 1 wherein:
    said transducer circuit means comprises means for generating said pulse waveform as a train of constant frequency pulses having a pulse width representative of throttle position.
3. A throttle advance signal generating circuit as claimed in claim 1 wherein:
    said amplifier circuit means comprises an operational amplifier.

4. A throttle advance signal generating circuit as claimed in claim 3 wherein:
    said sensing means comprises a temperature responsive circuit element electrically coupled in circuit with said amplifier circuit means.
5. A throttle advance signal generating circuit as claimed in claim 4 wherein:
    said element is a thermistor.
6. A throttle advance signal generating circuit as claimed in claim 3 wherein:
    a reference signal is supplied to one input of said operational aplifier;
    said pulse waveform is supplied to the other input of said operational amplifier;
    and means for trimming said analog signal at a selected set of throttle and temperature conditions such that the potential at the output of the operational amplifier is made equal to the average potential at said other input of the operational amplifier.
7. A throttle advance signal generating circuit as claimed in claim 6 wherein:
    said sensing means is electrically connected between said other input and said output of said operational amplifier.
8. A throttle advance signal generating circuit as claimed in claim 1 wherein:
    there is provided means for developing a rate signal representative of the rate of throttle operation;
    and means for developing said throttle advance signal as a function of both said signal and said analog signal.
9. A throttle advance signal generating circuit as claimed in claim 8 wherein:
    said rate signal is given only when the throttle is opened above a given rate.
10. A throttle advance signal generating circuit as claimed in claim 8 wherein:
    said rate signal, when given, overrides said analog signal.
11. A throttle advance signal generating circuit as claimed in claim 8 wherein:
    the sensitivity of said rate signal is a function of the ambient air temperature sensed by said sensing means.
12. A throttle advance signal generating circuit for generating a throttle advance signal representing a controlled amount of spark timing advance in response to operation of a carburetor throttle comprising:
    transducer circuit means for generating a pulse waveform representative of the throttle position;
    amplifier circuit means for converting said pulse waveform into an analog throttle position signal;
    means for differentiating said analog throttle position signal for developing a throttle rate signal;
    and means for adjusting the spark timing advance as a function of said analog throttle position signal and said rate signal.
13. A throttle advance signal generating circuit as claimed in claim 12 wherein:
    said rate signal is developed only for throttle opening.
14. A throttle advance signal generating circuit as claimed in claim 12 wherein:
    both said analog throttle position signal and said rate signal have respective characteristics which are functions of ambient air temperature.
15. A throttle advance signal generating circuit as claimed in claim 12 wherein:
    said rate signal, when given, overrides said analog throttle position signal.

* * * * *